Oct. 4, 1960 W. STEDTNITZ 2,955,169

MAGNETIC REPRODUCING AND RECORDING HEAD

Filed Nov. 2, 1954 5 Sheets-Sheet 1

Inventor
Wolfgang Stedtnitz
By Ralph B. Stewart
attorney

Oct. 4, 1960 W. STEDTNITZ 2,955,169

MAGNETIC REPRODUCING AND RECORDING HEAD

Filed Nov. 2, 1954 5 Sheets-Sheet 2

Inventor
Wolfgang Stedtnitz
By Ralph B. Stewart
Attorney

Oct. 4, 1960 W. STEDTNITZ 2,955,169

MAGNETIC REPRODUCING AND RECORDING HEAD

Filed Nov. 2, 1954 5 Sheets-Sheet 3

Inventor
Wolfgang Stedtnitz
By Ralph B. Stewart
Attorney

Inventor
Wolfgang Stedtnitz
By Ralph B. Stewart
Attorney

MAGNETIC REPRODUCING AND RECORDING HEAD

Filed Nov. 2, 1954 5 Sheets-Sheet 5

Inventor
Wolfgang Stedtnitz
By Ralph B. Stewart
Attorney

United States Patent Office 2,955,169

Patented Oct. 4, 1960

2,955,169

MAGNETIC REPRODUCING AND RECORDING HEAD

Wolfgang Stedtnitz, Bremen, Germany, assignor to Max Grundig, Furth, Germany

Filed Nov. 2, 1954, Ser. No. 466,251

Claims priority, application Germany Nov. 2, 1953

9 Claims. (Cl. 179—100.2)

The magnetic recording of television signals is difficult due to the great width of the band between 50 cycles to 5 megacycles to be recorded. On the other hand, the television signal is considerably less sensitive with respect to distortion than an audio signal, because the distortion factor causes only a loss in picture detail, for which the eye is rather insensitive due to its logarithmic sensitivity curve. The background noise should not exceed, if possible, 5% to assure a good reproduction of the picture. Therefore, a dynamic range of 25 to 30 db is sufficient.

In view of the fact that in case of magnetic sound recording, the highest frequency which can be recorded is dependent upon the width of the head gap, the tape material and the tape velocity, said parameters being physically or technically limited, other means must be used to record still higher frequencies. The following methods have been proposed to solve this problem by electronic means:

(1) Recording device for several lanes or tracks by means of a plurality of heads and an electron beam distributor tube. In this device, there are provided as many sound heads as a single line has picture elements, said sound heads being arranged in a row transversely with respect to the direction of motion of the tape. These sound heads are so thin that about 40 lanes or tracks can be recorded on a width of 2.5 centimeters. Thus, a tape of 25 cm. width would be required to record 400 tracks said tape being moved at a velocity of 60 cm. per second. The effectively high tape velocity is obtained, so to speak, by applying one line of a television frame in sequence to the individual heads of the head series with the result that the lines are perpendicularly recorded side by side. A special electron beam tube is used to distribute the signal impulses of one line to the heads, said tube being constructed as an electronic switching means. Such system introduces unwanted complexity due to the switching means, see U.S. Patent to Sziklai 2,517,808.

(2) Furthermore, it has been suggested to solve this problem by providing two heads and rotate them at a high velocity in a direction opposite to that of the tape, whereby the relative velocity between head and tape becomes very high. A trace (track) recording with interrupted trace (track) portions is obtained. Due to the high tape velocity, the wear and tear on the head is correspondingly high.

(3) According to another known method, the necessary high effective tape velocity is obtained by recording the sound on an endless, rapidly moving tape and subsequently copying it on a slowly running tape. The signals are then cleared from the rapidly running tape, whereupon this tape is ready to be used for recording at the next run. The copied record appears in condensed forms on the slowly running tape and has to be expanded for reproducing by means of a reverse operation. The wear and tear on the head and on the endless band is likewise high.

Experience has shown that in tape recording, the tape and the total width of the gap cannot be made too small if the signal to noise ratio is not to become too unfavorable. That means that also in case of picture recording a certain tape surface has to be scanned at a given frequency range. Thus, the tape has to store a certain minimum energy. If, for example, the maximum frequency of 10 kilocycles is assumed, which can still be recorded with a 10$\mu$ (10 microns) gap at a velocity of 10 centimeters per second, and a minimum tape width of 2 millimeters is used, the trace surface per second is:

$$\frac{\Delta F}{\Delta t}=10 \text{ cm./s.} \; . \; 0.2 \text{ cm.}=2 \text{ cm.}^2\text{/s.}$$

$\Delta F$=surface of magnetic tape, $\Delta t$=time period for the surface ΔF to pass by the magnetic head airgap.

Calculated for a frequency range of 4 megacycles:

$$\frac{\Delta F}{\Delta t}=\frac{4000 \text{ kc.}}{70 \text{ kc.}}\cdot 2 \text{ cm.}^2\text{/s.}=800 \text{ cm.}^2\text{/s.}$$

If a tape velocity of 2 meters per second is used, the width of the tape is:

$$B=\frac{800 \text{ cm.}^2\text{/s.}}{200 \text{ cm./s.}}=4 \text{ cm.}$$

$B$=width of tape obviously, another subdivision of the tape surface per second may be used.

For physical reasons, it is very difficult to control the required high tape velocity by mechanical means alone. The present invention solves this problem by obtaining the necessary effective tape velocity by magnetic-mechanical means. For this purpose, a recording and/or reproducing head is provided which is characterized in that it comprises a plurality of unit heads which are energized magnetically either together or in groups in recording the signal, and a magnetizing device for rendering the unit heads which are not used ineffective. The tape moves at a constant rate. The effective tape velocity amounts to the width of the tape times the number of the lines given per second.

One object of the invention is to provide a magnetic transducer capable of recording high frequency signals, such as television signals, on a movable record carrier.

Another object is to provide a system for magnetically recording and reproducing signals on a plurality of tracks on a record carrier.

Still another object is to selectively record or reproduce signals on any of several selected tracks of a plurality of tracks on a record carrier.

Other objects will become apparent from the following description when considered in connection with the drawings in which.

Figure 1:
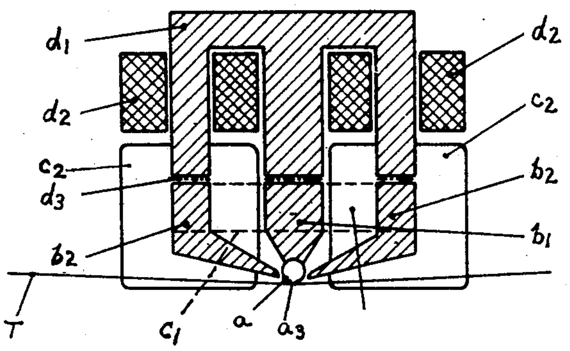
Fig. 1 is a cross-section of the transducer along line 1—1 of Fig. 2.
Figure 2:
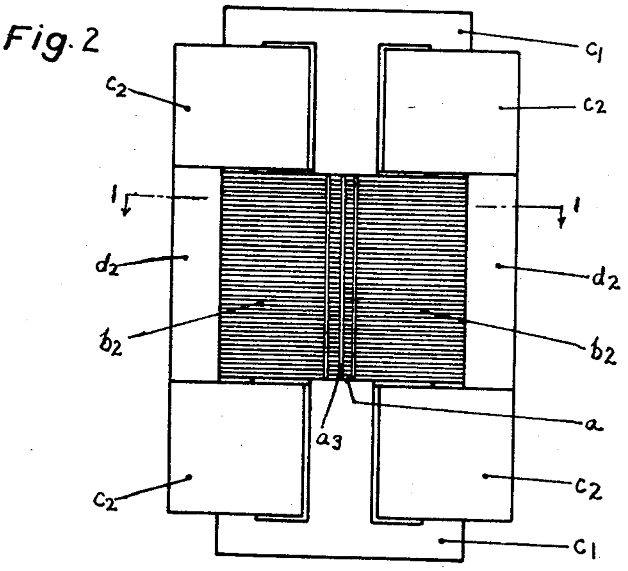
Fig. 2 is a bottom view of the assembled magnetic transducer or head.
Figure 3:
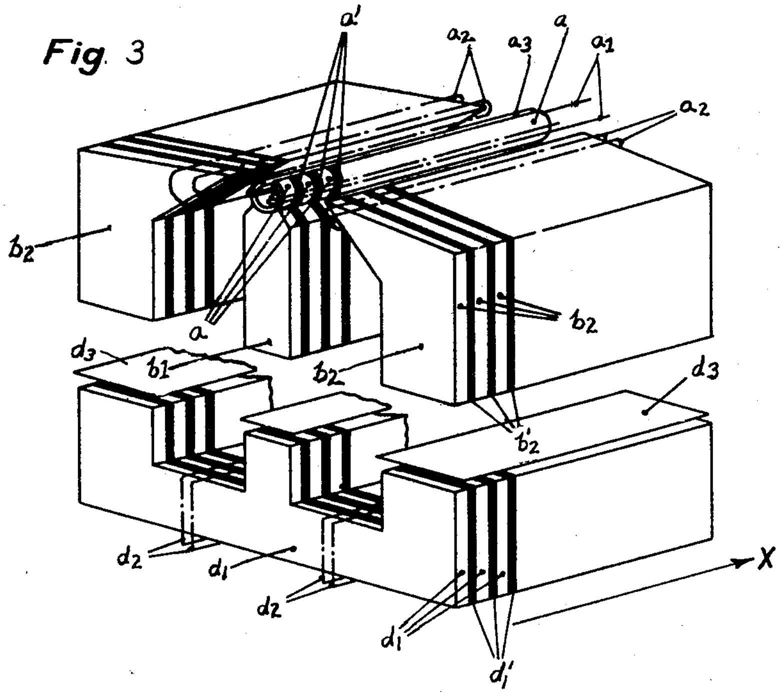
Fig. 3 is an enlarged prospective view of the transducer or head assembly.
Figure 4:
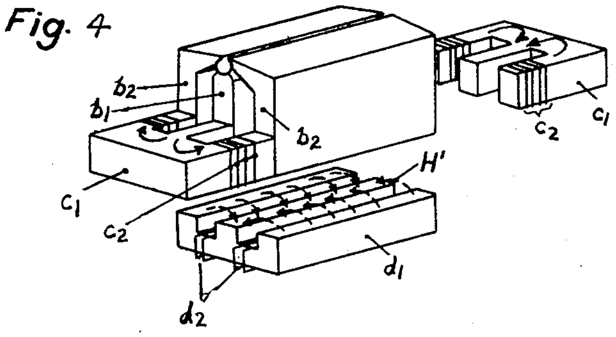
Fig. 4 is another perspective view of the head assembly showing the biasing magnets for producing the various magnetizing fields.
Figure 5:
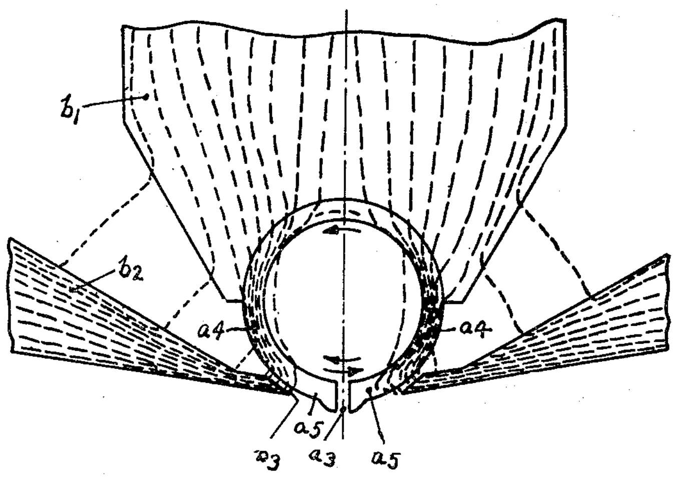
Fig. 5 shows an end view of a part of one of the units of which the head is composed.
Figure 6:
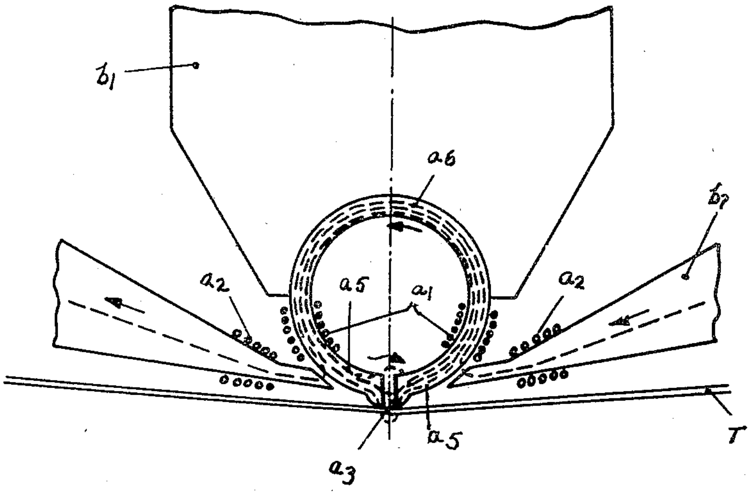
Fig. 6 is similar to the view shown in Fig. 5 and includes the signal and compensating coils.

The recording or reproducing head according to the invention will be described in detail with reference to the drawing. This head has four main parts as follows:

(1) A plurality of magnetically insulated unit heads *a* which are placed in layers one upon the other to form a stack. Each unit head *a* is in the form of a ring of thin magnetic material having a gap $a_3$ between two pole pieces $a_5$, $a_5$ (see Figures 5 and 6). These unit heads are energized together or in groups by means of energizing coils $a_1$ (Fig. 6) with the frequency spectrum or signals to be recorded. The additional magnetization devices ($c_1$, $c_2$ and $d_1$, $d_2$), referred to in (3) and (4) below, cause the magnetic saturation of the intermediate portions *a4* (Fig. 5) of all of the unit heads but one, or a few, in accordance with the field strength of the two magnetization devices. Thus, the tape T (Fig. 6) is magnetized by signal flux practically only at one point. The position of this one point may be shifted along the stack by changing the strength of one of the magnetizing fields. A compensation coil *a2* (Fig. 6) causes a compensation of the energizing field occurring in the gaps *a3* of the saturated unit heads. The tape T is premagnetized.

(2) A center pole piece *b1* and two outer pole pieces *b2* are formed of magnetically conducting and non-conducting layers in the same manner as the unit heads *a*. Center pole piece $b_1$ is arranged adjacent to the center section $a_6$ of the unit rings *a* (Fig. 6) while the pole pieces are arranged adjacent the pole sections $a_5$, $a_5$ of the rings *a* with air-gaps $b_3$, $b_3$ between them. The pole pieces have two purposes. First, they supply the magnetic flux necessary for the saturation, of the unit heads *a*, whereby the two outer pole pieces *b2* have the same polarity but which is opposite to the polarity of the inner pole piece b1. Secondly, a field strength drop along the length of the stack will occur in the non-magnetic layers if, perpendicularly with respect to the plane of the layers, a magnetic flux is produced by means of the magnetizing system described under (3). This field strength drop which in the inner pole pieces *b1* is of the opposite polarity to that in the outer pole pieces $b_2$, $b_2$ produces simultaneously the saturation flux for the unit heads *a*. In view of the fact that in the outer pole pieces *b2* the field strength at right angles to the plane of the layers, in passing from one end of the stack to the other, changes through all the values between plus H to zero to minus H, and the inner pole piece *b1* assumes values from minus H to zero to plus H, there occurs in the middle of the stack a zone in which the difference of the field strength between the inner and the outer pole pieces becomes zero, that is, the unit head *a* located in this zone is not normally saturated. The pole pieces *b1*, *b2* and *b2* are arranged symmetrically with respect to the axis of the gap so that disturbing fields are excluded from the magnetization system at the gap.

Figure 7:
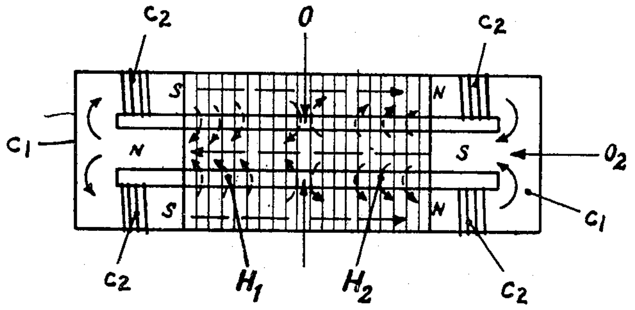
Fig. 7 shows the directions of the D.C. magnetic flux through the stack of elements comprising the head.

(3) A direct current magnetizing device comprising two electromagnets having E-shaped cores $c_1$, $c_1$ and windings $c_2$, $c_2$ mounted at the ends of the pole pieces and being adapted to produce a permanent magnet field or biasing field through the pole pieces at right angles to the plane of the layers. As explained under (2) above, the windings $c_2$, $c_2$ are so connected that the field strength produced by these windings between the inner and outer pole pieces $b_1$ and $b_2$ varies from a maximum of one polarity at one end of the stack, to zero at the middle, and then increases to a maximum value of the opposite polarity at the other end of the stack. Thus the center legs on cores $c_1$ at opposite ends of the stack are of opposite polarity. Fig. 7 shows the flux distribution in the magnetic head due to the biasing windings C2.

(4) A control magnetizing device comprising an electromagnet having an E-shaped core *d1* forming the yoke of the pole pieces, and carrying two magnetizing windings $d_2$, $d_2$ on the outer legs thereof.

Figure 8:
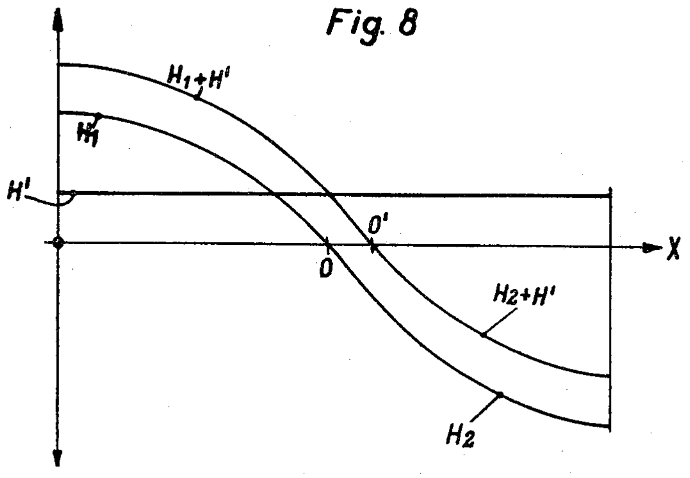
Fig. 8 depicts curves showing the manner in which the neutral magnetic zone of the head is shifted from one position to another.

A magnetic insulating layer or gap *d3* (Fig. 1) is disposed between the pole pieces $b_1$, $b_2$, $b_2$ and the E-shaped core *d1* to avoid short circuiting of the field of magnetizing device (3) across the E-shaped core *d1*. When the coils *d2* of the control electromagnet are energized, the flux produced thereby will be added to or subtracted from the saturation fluxes produced by the direct current magnetizing device described under (3). As a result of this, the neutral zone in the stack will be displaced, i.e., it will be shifted along the stack so that another unit head *a* becomes effective. If, for example, the control coils *d2* are fed by a saw-toothed pulse of line frequency, the neutral zone will be shifted throughout the length of the stack during each pulse, and all of the unit heads on account of this will be switched in one after the other. Fig. 8 shows the directions of the magnetic fields in the head. Curve $H_1$—O—$H_2$ shows the relative amplitude and direction of the magnetizing force due to coils C2, C2, along the length of the magnetic head, that is, from left to right in Fig. 5. $H^1$ indicates the field produced by the control sweep voltage at one instant, whereby the neutral point O has been shifted to the right to position $O^1$, thus in effect making an individual head at that position operative to record or reproduce a signal on the record carrier when energized by the signal current.

The invention will be explained in detail with reference to a practical embodiment.

Figure 9:
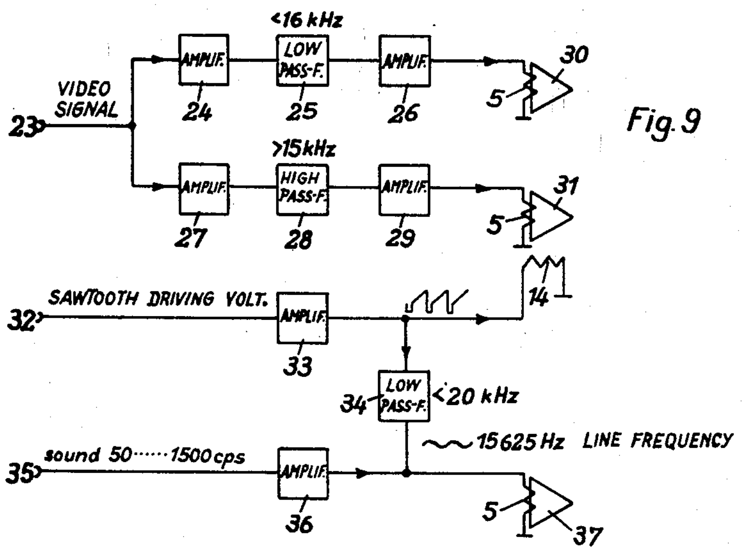
Figs. 9 and 10 show a two-channel video recording and reproducing system respectively, utilizing the magnetic head of this invention.

Fig. 9 shows a three-channel system for recording television signals. From suitable apparatus, for example from a television sender or receiver, the picture signals are supplied to terminal 23. The lower frequency band of 50 cycles (Hertz) to 16,000 cycles (kilohertz) is supplied over one channel from terminal 23 to winding 5 of a recording head 30 constructed according to this invention, this first channel including an amplifier 24, a low-pass filter 25 for excluding frequencies above 16,000 cycles/sec. and amplifier 26.

The higher-frequency band of picture signals are supplied over a second channel to winding 5 of a second recording head 31, the second channel including an amplifier 27, a high-pass filter 28 and an amplifier 29. The head 31 should be so constructed that the frequency band above the line frequency extending up to about 4 megacycles is permitted to pass. The third channel of Fig. 9 is for the simultaneous recording of sound and line synchronizing pulses. The line deflection voltage is applied by way of connection 32 and is amplified in amplifier 33 and then applied to the control-magnetizing coil 14 of the control-magnetizing-system. After the amplifier 33, part of the pulse mixture is taken off over the low-pass filter 34. The sound signals are supplied over connection 35 to amplifier stage 36 and are applied, along with the line deflection pulses from filter 34, to the signal winding 5 of a third recording head 37.

The head is designed in such a manner that a frequency range above the line frequency up to about 4 megacycles can be transmitted. The lower frequency range from 50 cycles up to 16 kilocycles is to be recorded in the usual manner. For this purpose, the tape is subdivided into three lanes or bands, i.e., one for the lower frequency range, one for the upper frequency range, and one for the simultaneous sound and line impulse recording (see Figs. 9 and 10). The frequency ratio in the lower and in the upper frequency range is approximately the same, namely:

$$\frac{16{,}000\text{ c.}}{50\text{ c.}}=320:1$$

$$\frac{4{,}000\text{ kc.}}{16\text{ kc.}}=250:1$$

Figure 10:
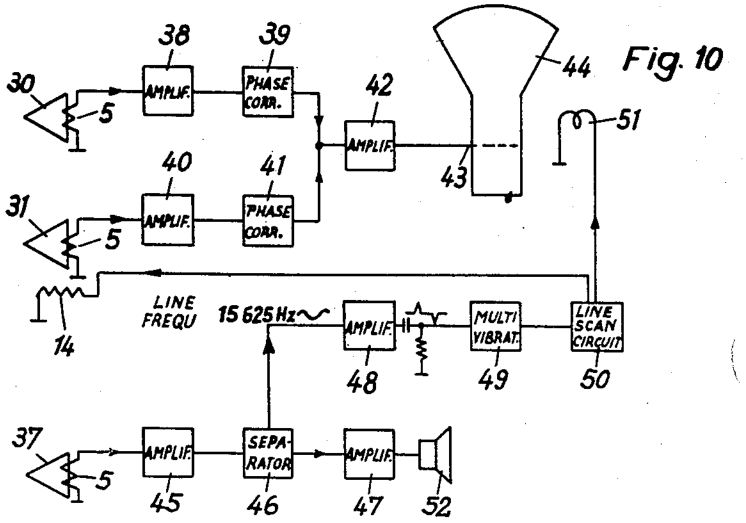

In view of the fact that the lower frequency range can be reproduced substantially linearly by means of sound recording in spite of the great dependence upon the frequency which is a physical condition, the same should be possible in the upper frequency range since the frequency ratio is the same. Figure 10 shows a system for the reproduction of the television signals recorded according to Figure 9 with the aid of the pick-up and receiving heads according to the invention. The head 30 scans again the part of the magnetic tape which was used for the recording of the lower frequencies. The recorded signal produces in the winding 5 of the head 30 a corresponding signal which by way of the amplifier 38 and the phase-correcting member 39 is led to the last stage 42 of the picture amplifier which is connected with a control electrode 43 of the picture reproducing tube 44. The pick-up is accomplished again by scanning or varying the control voltage in the coils 14. The high frequency band of recorded signal is scanned by head 31 and the signal from this head is amplified in amplifier 40 and is applied by phase-correction member 41 to the common picture-and-stage-amplifier 42. The track containing the recorded sound signal and the line synchronizing pulses is scanned by reproducing head 37 which is connected over amplifier 45 to a separator stage 46, where the sound signal and synchronizing pulses are separated. The sound signal is supplied through amplifier 47 to a loud speaker 52. The line synchronizing pulses are amplified at 48 and control a multivibrator 49 which controls the deflection stage 50. From this deflection stage a corresponding control signal is supplied to the coil 14 of the control magnet system, and simultaneously a deflection voltage is supplied to the deflection coil 51 of the picture producing tube 44.

From the electric point of view, care has to be taken that the self-capacitance of the energizing winding as well as the input capacitance of the following amplifier tubes are made extremely low for the reproduction so that the self-resonance in spite of the greatest number of turns, i.e., as great as possible, will be still about the highest frequency to be reproduced. A great number of turns should be used so that the lowest frequency will be reproduced with sufficient strength.

However, in saturated unit heads a lower permeability is effective so that the number of turns can be made relatively high in spite of the application of high-permeability ferrites. Indeed, the high permeability is practically effective only in such a unit head which has a relatively small iron cross-section. If several units heads *a* become operative due to correspondingly decreased energization of the magnetizing current, the inductivity of the coil *a*1 increases whereby simultaneously the definition property of the total head decreases so that the resulting decrease in resonant frequency will not be disturbing. In addition to this, the effective energy flux will be increased with the result that a corresponding higher voltage will be obtained. Therefore, we can choose either a large frequency band and a small input voltage, i.e., a lower noise to signal ratio, or a smaller frequency range and a higher input voltage, i.e., a good signal to noise ratio. The head for the recording is advantageously made of higher ohmic values.

The construction of the recording or reproducing head according to the invention should be carried out according to the following considerations:

(1) There should be the smallest possible leakage from one unit head to the other. The leakage is dependent on the ratio between the length of the conducting portion *a*5 and the thickness of the non-magnetic layer between the unit heads, and furthermore on the permeability of the portion *a*5. The length of the portion *a*5 should be as short as possible (approximately 12 times the thickness of the non-magnetic layer), while the permeability should be as great as possible. A calculation shows that the requirement of the permeability can be fulfilled by various commercial ferrites.

(2) There should be low losses at highest frequencies. Likewise, this requirement is fulfilled by various commercial ferrites.

(3) The dynamic range obtainable is a function of the constants of the material of the tape, and in addition to this, a function of rate at which the magnetic resistance section *a*4 (the saturation section) of the unit heads changes in the saturated and unsaturated state. This sudden change can be obtained by a corresponding construction and furthermore by a suitable selection of the materials to be employed.

If the unit head is saturated at the place between the pole pieces by the magnetizing system, the permeability is lowered and the magnetic resistance increases at the same ratio. The above described flux produced by the energizing coil *a*1 is to be removed by the saturation and this would take place as suddenly as possible. However, this does not take place completely because the permeability cannot go below the value 1 even if the saturation is increased to a high degree. Practically, this value 1 cannot be approached at all closely. Actually, the change of the magnetizing signal flux is equal to the ratio of the magnetic total resistance unsaturated to the total resistance saturated.

By employing a bridge circuit, the field strength produced by the remaining flux is completely suppressed, said bridge circuit being realized by a compensation coil *a*2. By correspondingly energizing the compensation coil *a*2, the energizing flux across the gap of the saturated unit head can be compensated and will become zero by this compensation.

(4) As described in the preceding paragraph, the magnetic resistance of the saturating portions *a*4 is to be changed as rapidly as possible under the action of the magnetization. For example, in a commercial ferrite, a noticeable decrease in permeability occurs up to a field strength of approximately 5 oersteds. A higher magnetization would be uneconomical. (At 100° centigrade the same saturation occurs at about 1 oersted.)

A saturation energization of $$\textcircled{H}^1=+a4.H^1$$

is necessary for a unit head, said energization decreasing as the magnetic potential drops in the pole pieces perpendicularly with respect to the plane of the unit heads. The required total energization for *n* unit heads amounts to:

$$\textcircled{H}=N.(a_4).H^1=N.\textcircled{H}^1$$

$\textcircled{H}^1$=saturation magnetization
$H^1$=magnetic field strength (in oersteds)
$a4$=saturation length (in cm.)
$n$=no. of unit heads If, for example, 800 unit heads are assumed and if the saturation portion *a*4 is .5 millimeter, there is obtained the following formula:

$$\textcircled{H}=N.(a4).H^1=800\,.\,0.05\text{ cm.}\,.\,50\ Oe.=160\ Aw$$

$Oe.$=oersteds
$Aw$=ampere-turns

This saturation is easily obtainable with a coil cross-section of 2 cm. squared. However, two direct current magnetization coils *c*2 are employed to obtain the necessary magnetic potential. The core sheets $c_1$ are made of highly permeable material, so that the leakage is as low as possible. The third magnetizing coil *d*2 fed by the line frequency is provided for the same energization.

(5) Furthermore, care has to be taken that the rather strong field of the magnetizing system does not scatter or leak on to the taps and cause disturbances or even extinction of the signals. By using high permeable material for the pole pieces, the leakage field can be kept small. Secondly, the magnetic leakage field can be completely avoided by an entirely symmetrical design of the head whereby the magnetic axis of symmetry runs through the gap. No field of the magnetization system will be produced in the gap and in its neighborhood. Only the field of the signal modulated energizing coil $a1$ will be effective.

It is a requirement for exact symmetry that the saturation induction for the two halves of the unit head $a$ be exactly the same. It can be shown that without this provision no compensation of the leakage field is possible. This requires that on both sides a separate control of the saturation energization is provided. This is obtained by an adjustable air gap $b3$ (Fig. 5) which has to have the same magnetic resistance as the saturation portion $a4$ in the saturating condition. The air gap is located between the pole pieces $b2$ and the unit heads $a$ and avoids at the same time a magnetic short-circuit of the unit heads $a$ across the pole pieces $b2$.

Secondly, care has to be taken that the flux produced by the magnetization system flowing through the two branches or legs of the unit heads becomes exactly equal, i.e., the magnetic resistances of the saturating portions $a4$ have to be exactly equal. Therefore, the length of the saturating portions has to be made adjustable. Obviously, the halves of the energizing coil $a1$ and of the compensation coil $a2$ should have the same number of turns. In spite of this, care should be taken to obtain symmetry in the subsequent amplifying input circuit. A fine adjustment of the minimum of the period of disturbance is obtained thereby.

The recording and reproducing head according to the invention is not limited in its application to television. It can be advantageously used, for example, for:

First, recording of several sound lanes or channels in such a manner that a certain adjustable trace is traced by means of the magnetizing system. By changing the direct current field, another trace or lane can be selectively traced and adjusted.

Second, simultaneous recording of several sound lanes or channels by means of an impulse coding.

Third, recording of measured values to control industrial plants.

Fourth, program circuits.

Five, the storing of numbers for electronic calculating machines.

I claim:

1. A translating head for magnetic recording systems comprising, a plurality of magnetic head units arranged in a stack and being spaced apart in said stack; each head unit comprising a thin ring of magnetic material having a gap therein, a central pole piece of thin magnetic material arranged adjacent the central portion of said ring opposite said gap, two outer pole pieces of thin magnetic material arranged adjacent portions of said ring on opposite sides of said gap and being spaced from said central pole piece; a signal coil linking the portions of said ring between said central pole piece and said outer pole pieces; means for magnetizing said central pole pieces at opposite polarity with respect to the outer pole pieces, means at one end of said stack for establishing a magnetic field in said pole pieces in a direction normal to the plane of said head units, and means at the other end of said stack for establishing another magnetic field in said pole pieces normal to the plane of said head units and in a direction tending to magnetize said pole pieces to opposite polarities with respect to the polarities at the said one end of the stack.

2. A translating head for magnetic recording systems comprising, a plurality of thin magnetic head members arranged in a stack and being spaced apart in said stack, a signal coil magnetically coupled to said head units, magnetic biasing means separate from said signal coil for applying to the members in said stack magnetizing forces, which are individual to the different magnetic members in said stack, and control magnetizing means separate from said signal coil for applying an adjustable magnetizing force to all of said members simultaneously whereby the magnetizing force applied by said biasing means may be neutralized in any particular member in said stack.

3. A translating head for magnetic recording systems comprising, a plurality of magnetic head units arranged in a row and being spaced apart in said row, a magnetic pole piece arranged adjacent each head unit in spaced relation thereto, magnetic biasing means for establishing a magnetic field between said head units and said pole pieces, said field being of one polarity at one end of said row and decreasing in value to zero near the middle of said row and then reversing in polarity and increasing in value to the other end of said row, and control means for establishing a second magnetic field between said head units and said pole pieces of one polarity throughout said row and of adjustable value, and a signal coil magnetically coupled to said head units.

4. A translating head for magnetic recording systems comprising, a plurality of magnetic head elements arranged in a row and being spaced apart in said row, a signal coil magnetically coupled to said head units, magnetizing means separate from said signal coil for applying magnetizing forces to the elements in said row, said magnetizing forces being of one polarity at one end of said row and decreasing in value to zero near the middle of said row and then reversing in polarity and increasing in value to the other end of said row, and second magnetizing means separate from said signal coil for applying to the head elements in said row magnetizing forces of uniform value and of the same polarity throughout said row, and means for varying the value of said second magnetizing forces.

5. A translating head for magnetic recording systems as in claim 1 wherein all but a small number of said unit heads are super-saturated by said fields and further including a compensating coil on the outer pole pieces for suppressing the remaining signal flux in the gaps of each saturated unit head.

6. A system for recording and reproducing signals on a magnetic record carrier comprising a plurality of separate magnetic transducers arranged across the width of the carrier, means for applying magnetizing forces to said transducers to decrease their permeability, said magnetizing forces being of one polarity at one end of the plurality and decreasing to zero near the middle and then reversing in polarity and increasing in value to the other end of the plurality, and second magnetizing means for applying to the transducers magnetizing forces varying in value such as to increase the permeability of each transducer in turn, signal coil means cooperating with the transducers, and a compensating biasing means associated with the transducers for providing sufficient flux to remove that produced by the signal coil in all transducers except that of increased permeability.

7. An electromagnetic transducer comprising a magnetic core, a signal coil on said core, a magnetizable record carrier movable past said core, means separate from said coil for magnetically biasing the core to render it non-permeable when a field is produced by said coil in accordance with signal currents therein, and second magnetic biasing means separate from said coil for periodically neutralizing the magnetic bias produced by said first biasing means to render the core permeable to a field produced by signal currents in said signal coil.

8. An electromagnetic transducer comprising a magnetic core, a signal coil on said core, means for normally magnetizing said core to decrease its permeability to render it non-magnetizable by said signal, and a separate magnetizing means operating independently of said signal coil for periodically magnetizing said core in such a direction as to remove the normal magnetizing force to allow the core to be magnetized in accordance with the signal.

9. A translating head for magnetic recording systems comprising, a plurality of magnetic head units arranged in a stack and being spaced apart in said stack; each head unit comprising a thin ring of magnetic material having a gap therein, said rings being arranged in said stack with their gaps in alignment, a signal coil linking the rings and producing in each ring a magneto-motive force tending to establish a flux across said gaps when the coil is energized by signal current, means acting independently of said signal current for magnetically saturating a portion of each ring normally to prevent appreciable signal flux from flowing across said gaps, and means separate from said signal coil for selectively unsaturating a desired one of said rings whereby signal flux will flow across its gap when said coil is energized.

References Cited in the file of this patent

UNITED STATES PATENTS

| | | |
|---|---|---|
| 2,618,709 | Eckert | Nov. 18, 1952 |
| 2,641,656 | Dicke | June 9, 1953 |
| 2,704,789 | Kornei | Mar. 22, 1955 |
| 2,743,320 | Daniels | Apr. 24, 1956 |
| 2,806,904 | Atkinson et al. | Sept. 17, 1957 |
| 2,822,427 | Atkinson et al. | Feb. 4, 1958 |